(12) United States Patent
Carey et al.

(10) Patent No.: US 11,680,636 B2
(45) Date of Patent: Jun. 20, 2023

(54) PUMP DRIVE ARCHITECTURE FOR AN AUTOMATIC TRANSMISSION

(71) Applicant: GM Global Technology Operations LLC, Detroit, MI (US)

(72) Inventors: Clinton E. Carey, Highland, MI (US); James M. Hart, Belleville, MI (US); Daryl A. Wilton, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 122 days.

(21) Appl. No.: 17/460,899

(22) Filed: Aug. 30, 2021

(65) Prior Publication Data

US 2023/0064218 A1    Mar. 2, 2023

(51) Int. Cl.
| | | |
|---|---|---|
| *B60K 17/10* | (2006.01) | |
| *F16H 57/023* | (2012.01) | |
| *F16H 57/031* | (2012.01) | |
| *F16H 61/30* | (2006.01) | |
| *F16H 47/06* | (2006.01) | |
| *B60K 17/08* | (2006.01) | |
| *F16H 57/02* | (2012.01) | |

(52) U.S. Cl.
CPC ........... *F16H 57/023* (2013.01); *B60K 17/10* (2013.01); *F16H 47/06* (2013.01); *F16H 57/031* (2013.01); *F16H 61/30* (2013.01); *B60K 17/08* (2013.01); *F16H 2057/02026* (2013.01); *F16H 2057/02047* (2013.01)

(58) Field of Classification Search
CPC ...... F16H 57/023; F16H 47/06; F16H 57/031; F16H 2057/0202; F16H 61/30; F16H 2057/02047; B60K 17/10; B60K 17/08
See application file for complete search history.

(56) References Cited

U.S. PATENT DOCUMENTS

| | | | | |
|---|---|---|---|---|
| 4,289,045 A | * | 9/1981 | Brisabois | F16H 57/037 475/71 |
| 5,314,616 A | * | 5/1994 | Smith | B01D 29/39 184/6.24 |
| 5,846,153 A | * | 12/1998 | Matsuoka | B60K 17/08 475/320 |
| 6,344,010 B1 | * | 2/2002 | Tajima | F16H 57/08 475/346 |
| 6,988,831 B2 | * | 1/2006 | Nakamura | F16C 33/58 384/513 |
| 7,412,913 B2 | | 8/2008 | Ishikawa et al. | |

(Continued)

FOREIGN PATENT DOCUMENTS

CN    105508572 B  * 12/2018  ............. F16H 47/06

*Primary Examiner* — Frank B Vanaman
(74) *Attorney, Agent, or Firm* — Cantor Colburn LLP (57) ABSTRACT

A transmission system has a housing including a wall and a gear support extending from the wall. The gear support has an outer surface and an inner surface defining a passage. The outer surface includes a seal receiving portion and a seal support axially spaced from the seal receiving portion. A seal is positioned about the gear support at the seal receiving portion. A sleeve is arranged on the outer surface of the gear support between the wall and the seal and a pump drive gear is mounted on the gear support and is supported by the sleeve. The pump drive gear includes an outer toothed surface, an inner surface, and a bushing arranged on the inner surface, the bushing extending about the sleeve.

20 Claims, 8 Drawing Sheets

(56) References Cited

U.S. PATENT DOCUMENTS

| | | | |
|---|---|---|---|
| 8,986,144 B2* | 3/2015 | Takemoto | F16H 57/021 |
| | | | 403/359.1 |
| 9,273,769 B2* | 3/2016 | Mizuno | F16H 41/02 |
| 9,574,619 B1* | 2/2017 | Littlefield | F16D 23/12 |
| 10,208,850 B1* | 2/2019 | Patel | F16H 57/02 |
| 10,895,285 B2* | 1/2021 | Soroka | F16H 57/0025 |
| 2009/0088282 A1* | 4/2009 | Iwasaki | F16H 3/66 |
| | | | 475/159 |
| 2010/0081537 A1* | 4/2010 | Sakaue | F16H 57/023 |
| | | | 475/331 |

* cited by examiner

PUMP DRIVE ARCHITECTURE FOR AN AUTOMATIC TRANSMISSION

INTRODUCTION

The subject disclosure relates to the art of vehicles and, more particularly, to a pump drive architecture for an automatic transmission.

In an automatic transmission, a pump is used to pressurize and direct hydraulic fluid. The hydraulic fluid may be used to activate clutches which, in turn, stop or release gears to provide power to portions of a vehicle drive train. Typically, the pump is driven by a torque converter which is mounted to, and driven by, a vehicle engine. In most cases, the torque converter includes a hub having one or more tangs. The pump includes a drive gear having tang receiver(s). The torque converter is married to the automatic transmission such that the tangs engage with the tang receivers. Rotation of the hub is transferred to the drive gear which, in turn, rotates a driven pump gear.

When marrying the automatic transmission to the vehicle engine, the torque converter hub is guided into an opening of the pump. The hub may be manipulated to ensure that the tang(s) extend into the tang receiver(s). Any misalignment between the hub and the drive gear may lead to unwanted noise and wear. Accordingly, it is desirable to provide a system for ensuring proper alignment of a torque converter and a pump drive gear in order to maintain selected noise output and enhance an overall operational life of the automatic transmission.

SUMMARY

Disclosed is a transmission system having a housing including a wall and a gear support extending from the wall. The gear support has an outer surface and an inner surface defining a passage. The outer surface includes a seal receiving portion and a seal support axially spaced from the seal receiving portion. A seal is positioned about the gear support at the seal receiving portion. A sleeve is arranged on the outer surface of the gear support between the wall and the seal and a pump drive gear is mounted on the gear support and is supported by the sleeve. The pump drive gear includes an outer toothed surface, an inner surface, and a bushing arranged on the inner surface, the bushing extending about the sleeve.

In addition to one or more of the features described above or below, or as an alternative, further embodiments could include wherein the pump drive gear includes a surface extending between the inner surface and the toothed surface, the surface including at least two drive slots.

In addition to one or more of the features described above or below, or as an alternative, further embodiments could include a torque converter including a drive shaft connectable to the pump drive gear, the drive shaft including at least two drive tangs extending into the at least two drive slots.

In addition to one or more of the features described above or below, or as an alternative, further embodiments could include a sleeved bushing arranged in the drive shaft, the sleeved bushing sealingly engaging the seal.

In addition to one or more of the features described above or below, or as an alternative, further embodiments could include a first sleeve mounted on the gear support axially inwardly of the seal and a second sleeve mounted on the drive shaft axially outwardly of the seal, the first sleeve engaging the bushing on the drive gear and the second sleeve engaging the sleeved bushing in the drive shaft of the torque converter.

In addition to one or more of the features described above or below, or as an alternative, further embodiments could include a cover mounted to the housing over the drive gear and a seal element mounted to the cover, the seal element engaging the drive shaft of the torque converter.

In addition to one or more of the features described above or below, or as an alternative, further embodiments could include the seal support includes at least one gap and the seal includes at least one tab that is received in the at least one gap.

Also disclosed is a drive system including a motor and a transmission system connected to the motor. The transmission system has a housing including a wall and a gear support extending from the wall. The gear support has an outer surface and an inner surface defining a passage. The outer surface includes a seal receiving portion and a seal support axially spaced from the seal receiving portion. A seal is positioned about the gear support at the seal receiving portion. A sleeve is arranged on the outer surface of the gear support between the wall and the seal and a pump drive gear is mounted on the gear support and is supported by the sleeve. The pump drive gear includes an outer toothed surface, an inner surface, and a bushing arranged on the inner surface, the bushing extending about the sleeve.

In addition to one or more of the features described above or below, or as an alternative, further embodiments could include wherein the pump drive gear includes a surface extending between the inner surface and the toothed surface, the surface including at least two drive slots.

In addition to one or more of the features described above or below, or as an alternative, further embodiments could include a torque converter mechanically connected to the motor, the torque converter including a drive shaft connected to the pump drive gear, the drive shaft including at least two drive tangs extending into the at least two drive slots.

In addition to one or more of the features described above or below, or as an alternative, further embodiments could include a sleeved bushing arranged in the drive shaft, the sleeved bushing sealingly engaging the seal.

In addition to one or more of the features described above or below, or as an alternative, further embodiments could include a first sleeve mounted on the gear support axially inwardly of the seal and a second sleeve mounted on the drive shaft axially outwardly of the seal, the first sleeve engaging the bushing on the drive gear and the second sleeve engaging the sleeved bushing in the drive shaft of the torque converter.

In addition to one or more of the features described above or below, or as an alternative, further embodiments could include a cover mounted to the housing over the drive gear and a seal element mounted to the cover, the seal element engaging the drive shaft of the torque converter.

In addition to one or more of the features described above or below, or as an alternative, further embodiments could include the seal support includes at least one gap and the seal includes at least one tab that is received in the at least one gap.

Still further disclosed is a vehicle including a body, a plurality of wheels supporting the body, and a drive system operatively connected to one or more of the plurality of wheels. The drive system includes a motor and a transmission system connected to the motor. The transmission system has a housing including a wall and a gear support extending from the wall. The gear support has an outer surface and an inner surface defining a passage. The outer surface includes a seal receiving portion and a seal support axially spaced from the seal receiving portion. A seal is positioned about the gear support at the seal receiving portion. A sleeve is arranged on the outer surface of the gear support between the wall and the seal and a pump drive gear is mounted on the gear support and is supported by the sleeve. The pump drive gear includes an outer toothed surface, an inner surface, and a bushing arranged on the inner surface, the bushing extending about the sleeve.

In addition to one or more of the features described above or below, or as an alternative, further embodiments could include wherein the pump drive gear includes a surface extending between the inner surface and the toothed surface, the surface including at least two drive slots.

In addition to one or more of the features described above or below, or as an alternative, further embodiments could include a torque converter mechanically connected to the motor, the torque converter including a drive shaft connectable to the pump drive gear, the drive shaft including at least two drive tangs extending into the at least two drive slots.

In addition to one or more of the features described above or below, or as an alternative, further embodiments could include a sleeved bushing arranged in the drive shaft, the sleeved bushing sealingly engaging the seal.

In addition to one or more of the features described above or below, or as an alternative, further embodiments could include the seal support includes at least one gap and the seal includes at least one tab that is received in the at least one gap.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
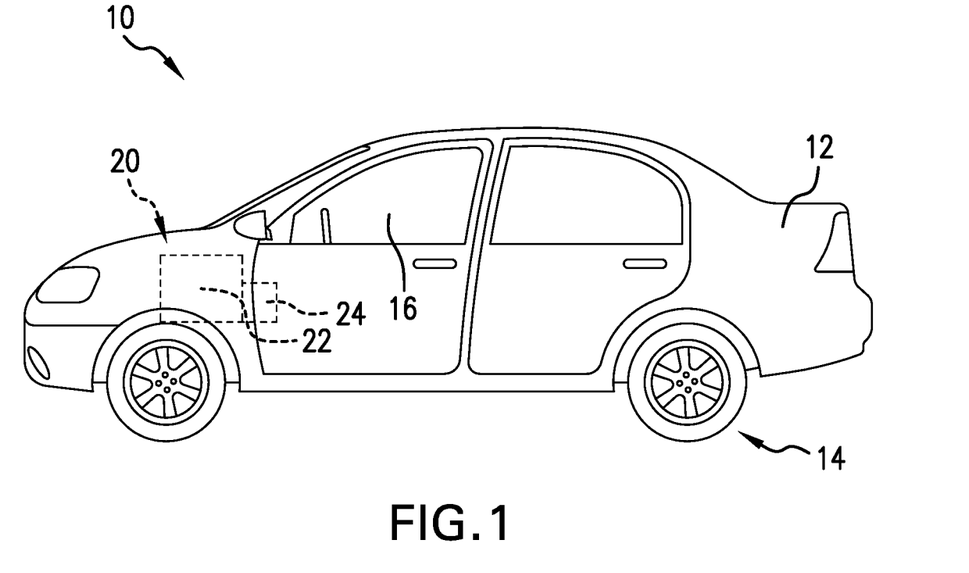
FIG. 1 depicts a vehicle including a transmission system, in accordance with a non-limiting example.
Figure 2:
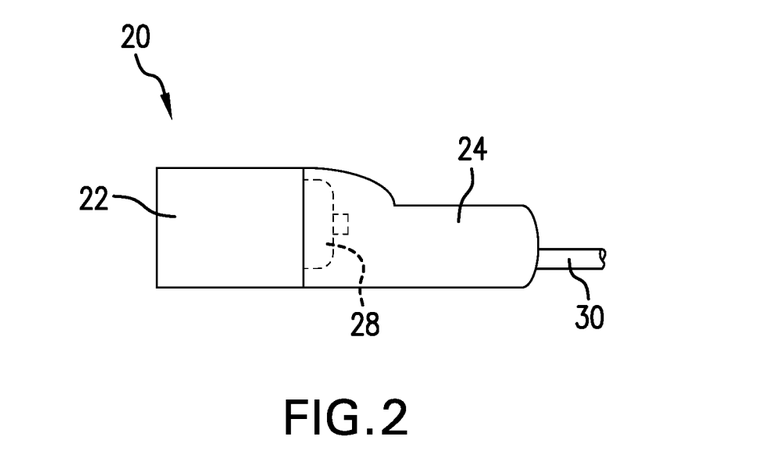
FIG. 2 depicts a drive system of the vehicle of FIG. 1, in accordance with a non-limiting example.

A vehicle, in accordance with a non-limiting example, is indicated generally at 10 in FIG. 1. Vehicle 10 includes a body 12 supported by a plurality of wheels 14. Body 12 defines, in part, a passenger compartment 16 within which may sit a driver. At this point, it should be understood that vehicle 10 may be autonomous and thus no driver may be present in passenger compartment 16. Vehicle 10 includes a drive system 20 that is connected to one or more of the plurality of wheels 14. As shown in FIG. 2, drive system 20 includes an engine or motor 22 operatively connected to a transmission system 24 via a torque converter 28. Transmission system 24 includes a drive shaft 30 that transforms energy from motor 22 to one or more of the plurality of wheels. It should be understood that motor 22 may take on a variety of forms including internal combustion (IC) engines, hybrid motors, electric motors, and the like.

Figure 3:
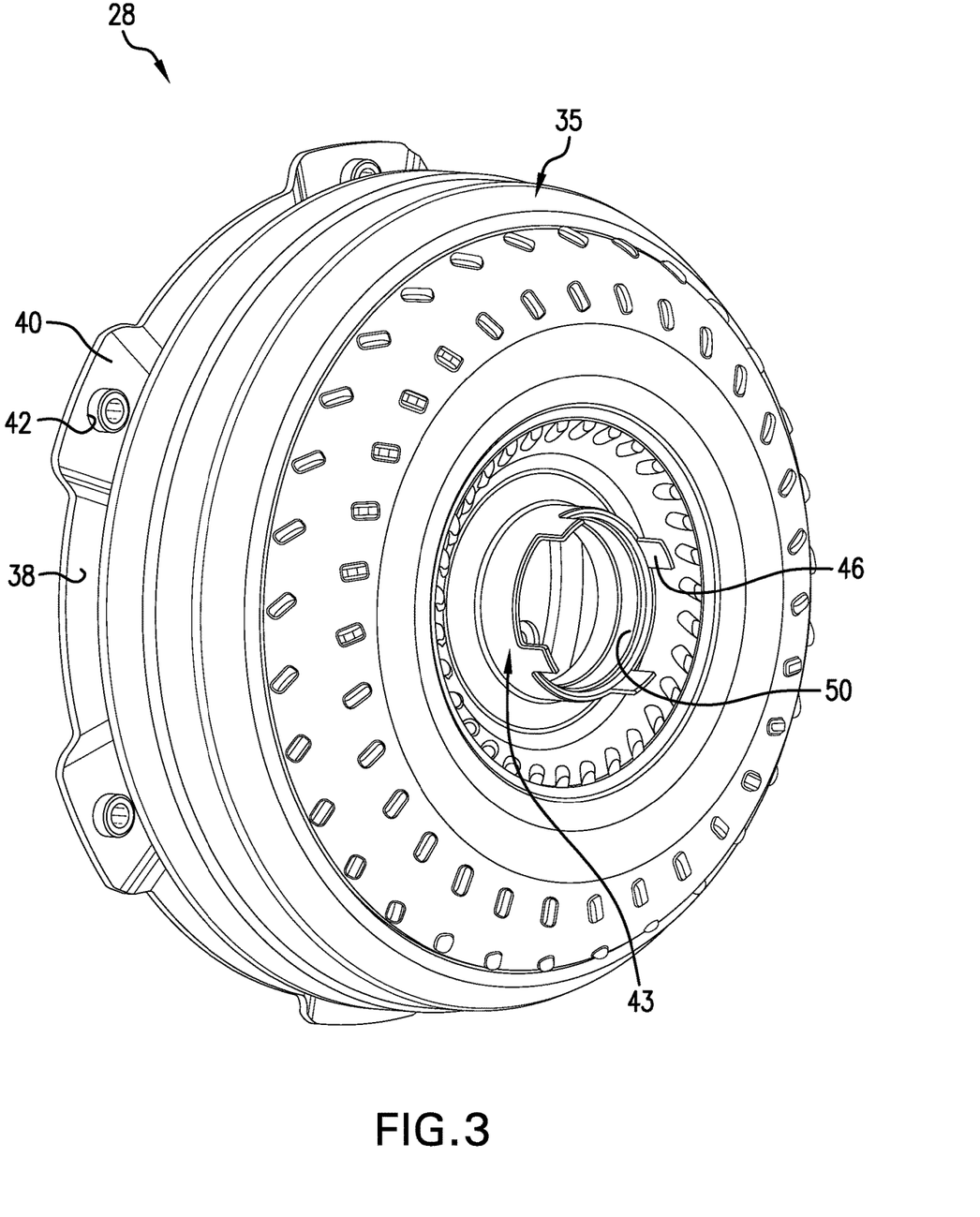
FIG. 3 depicts a torque converter of the transmission system of FIG. 1, in accordance with a non-limiting example.

As shown in FIG. 3, torque converter 28 includes a body 35 including a base 38 supporting a number of mounting lugs 40 that serve as an interface with motor 22. Mounting lugs 40 may, for example, may be connected to a fly wheel (not shown) of motor 22 with mechanical fasteners 42. Torque converter 28 also includes a drive shaft 43 that is connected to transmission system 24 as will be detailed more fully herein. Drive shaft 43 includes a plurality of drive tangs 46 that extend outwardly of body 35. Drive shaft 43 also includes an inner surface (not separately labeled) that supports a sleeved bushing 50.

Figure 4:
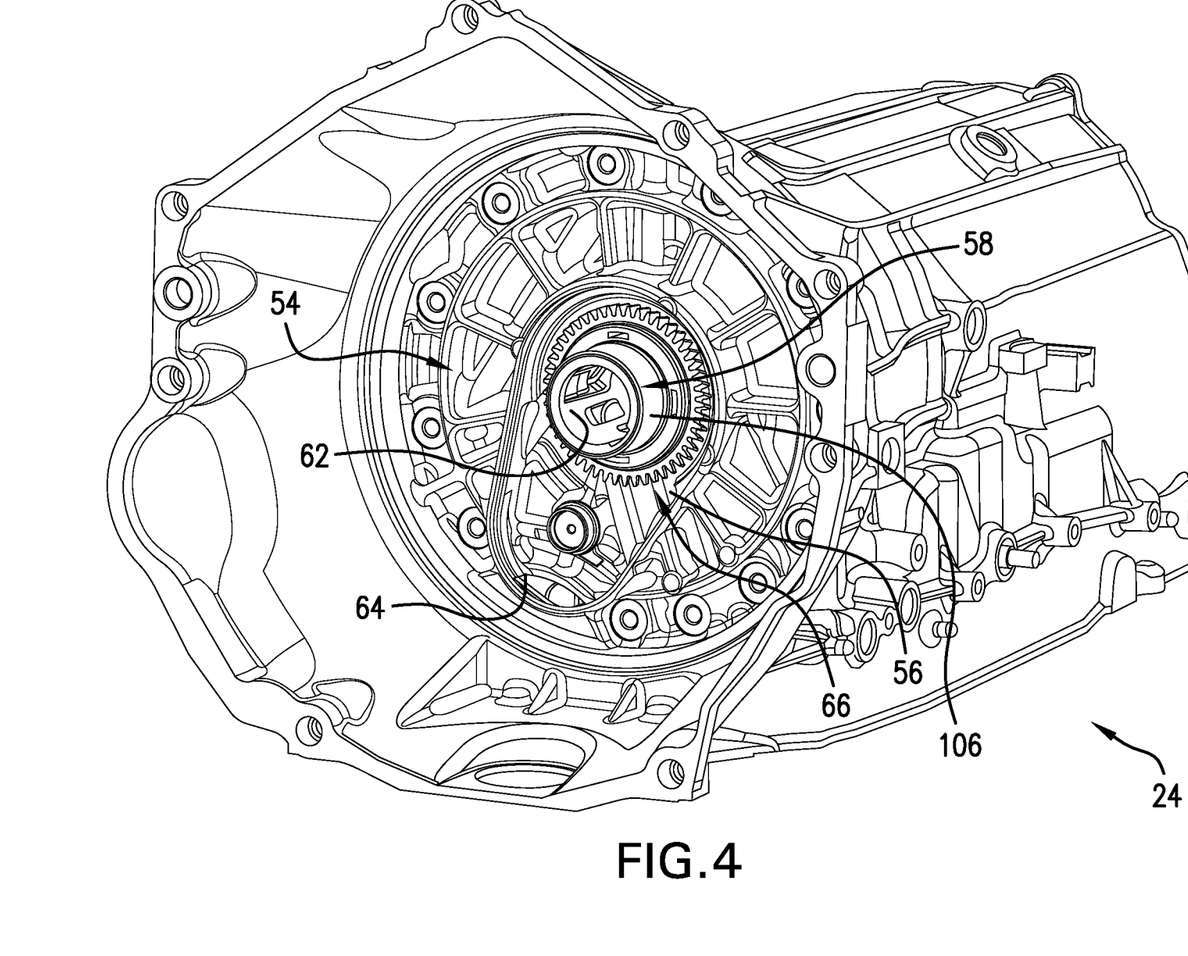
FIG. 4 depicts a front perspective view of a transmission of the transmission system, in accordance with a non-limiting example.
Figure 5:
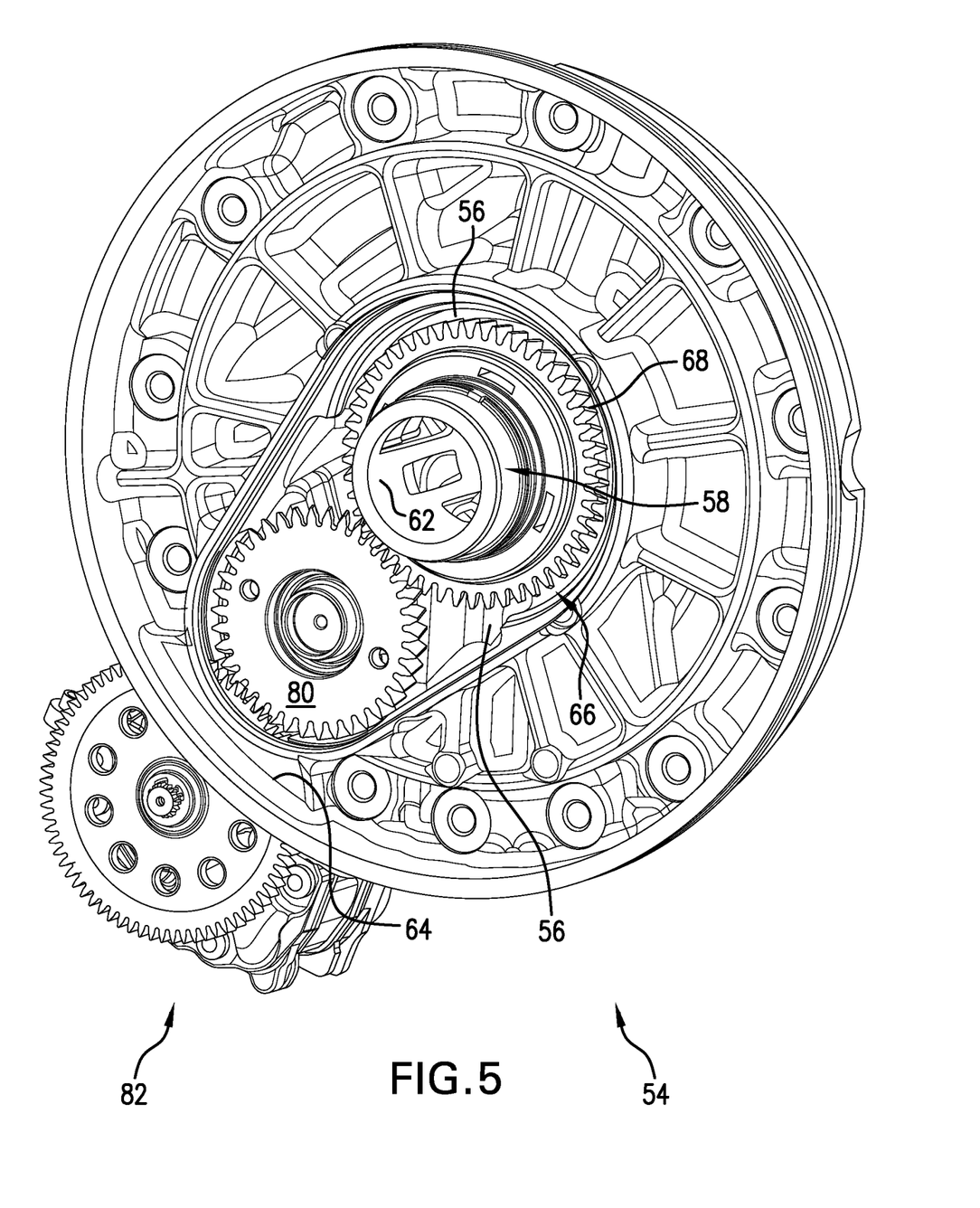
FIG. 5 is a partial perspective view of a pump housing of the transmission of FIG. 4, in accordance with a non-limiting example.
Figure 6:
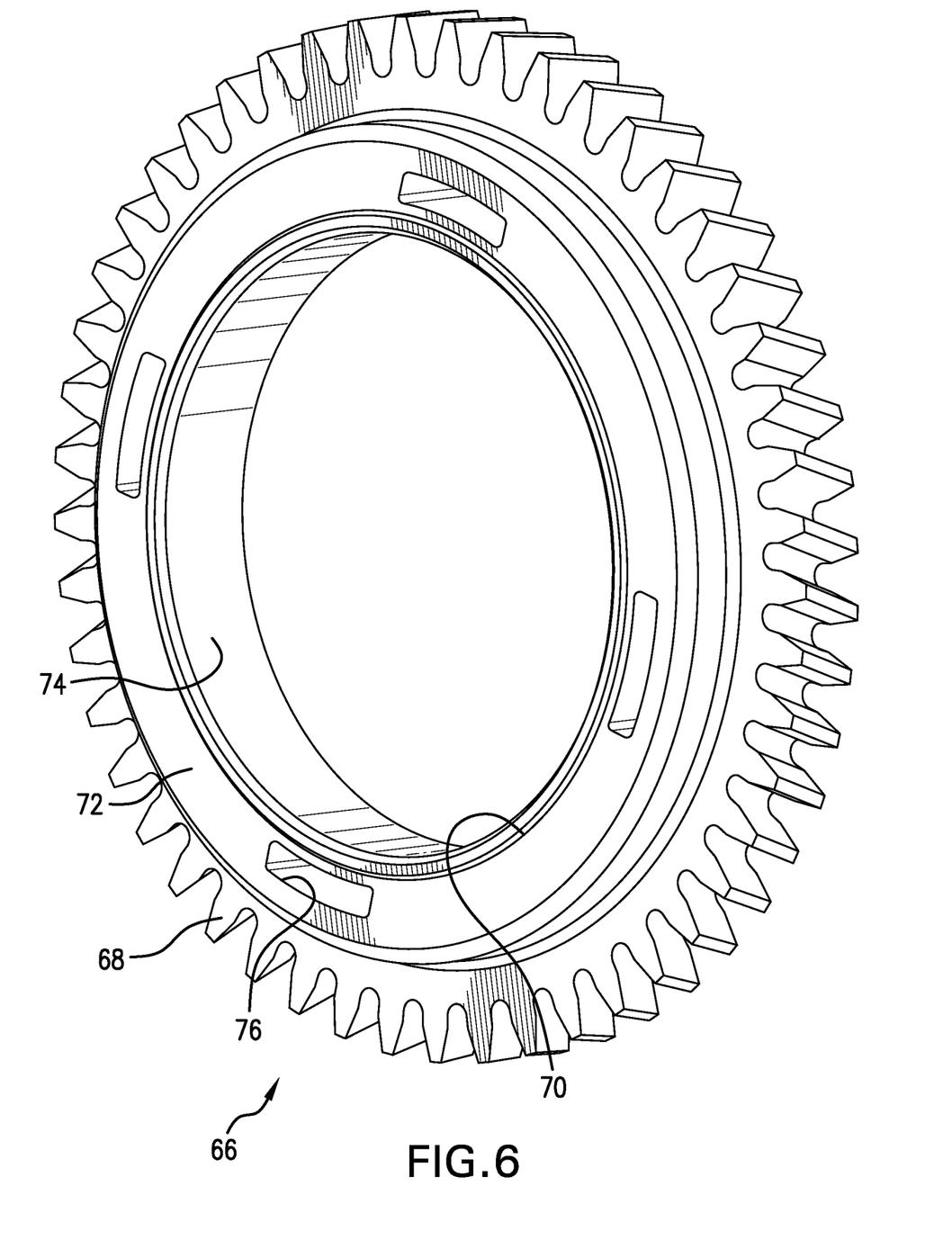
FIG. 6 depicts a pump drive gear of the transmission of FIG. 4, in accordance with a non-limiting example.

Reference will now follow to FIGS. 4 and 5 in describing a portion of transmission system 24. Transmission system 24 includes a pump housing 54 defining, in part, a wall 56. A gear support 58 extends from wall 56. Gear support 58 includes an outer surface 60 (FIG. 7) and an inner surface 62. Pump housing 54 also includes an opening 64. A pump drive gear 66, such as shown in FIG. 6, is mounted to gear support 58. Pump drive gear 66 includes an outer toothed surface 68, an inner surface 70, and a face or surface 72 that extends between outer toothed surface 68 and inner surface 70. A bushing 74 is mounted to inner surface 70. Surface 72 includes a plurality of drive slots 76 that receive corresponding ones of drive tangs 46 on drive shaft 43. Pump drive gear 66 meshingly engages with a driven gear 80 which, in turn, engages a transmission pump 82 through opening 64.

Figure 7:
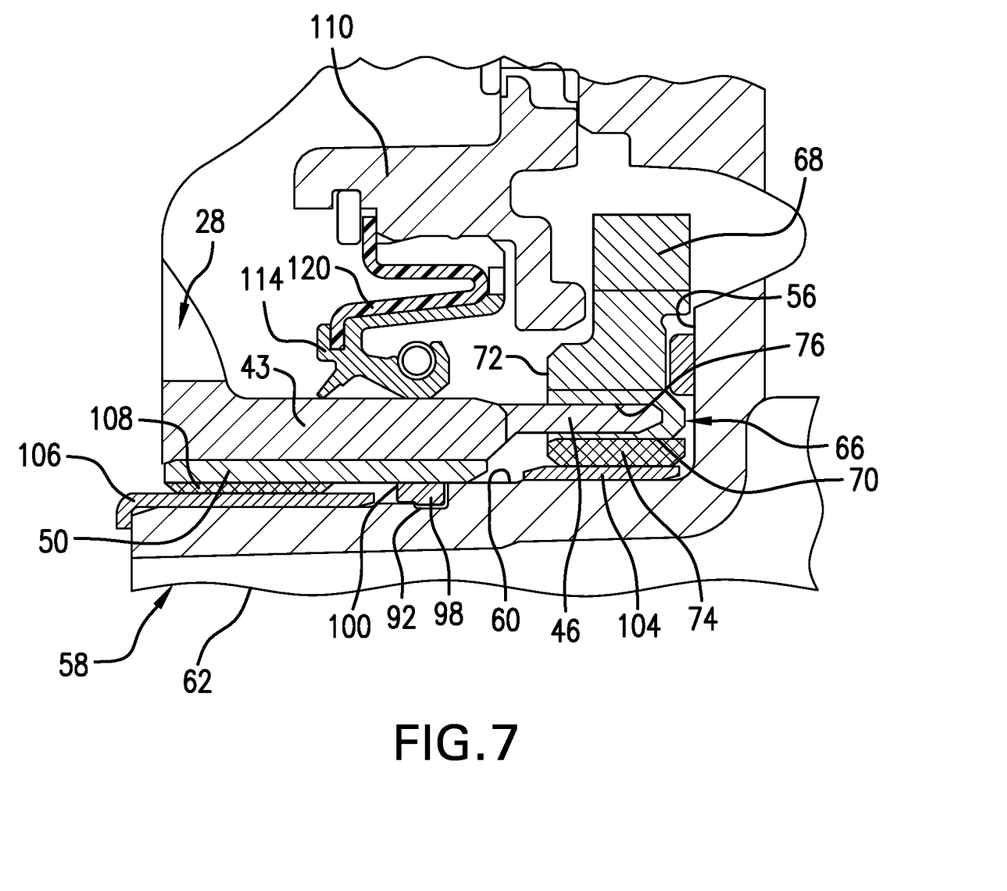
FIG. 7 is a partial cross-sectional view of torque converter drive shaft engaging the pump drive gear of FIG. 6, in accordance with a non-limiting example.
Figure 8:
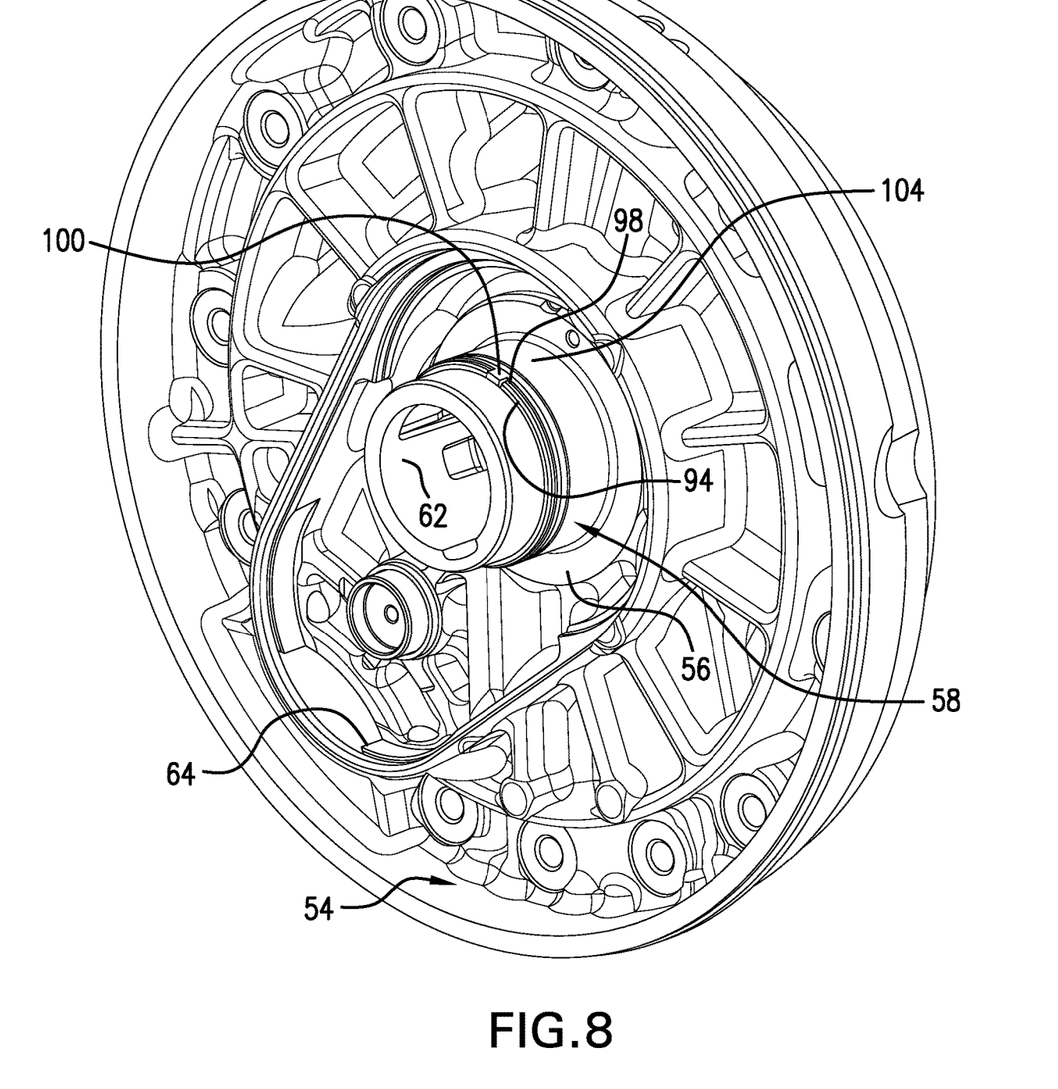
FIG. 8 is a partial perspective view of a pump housing of the transmission of FIG. 4, in accordance with a non-limiting example.
Figure 9:
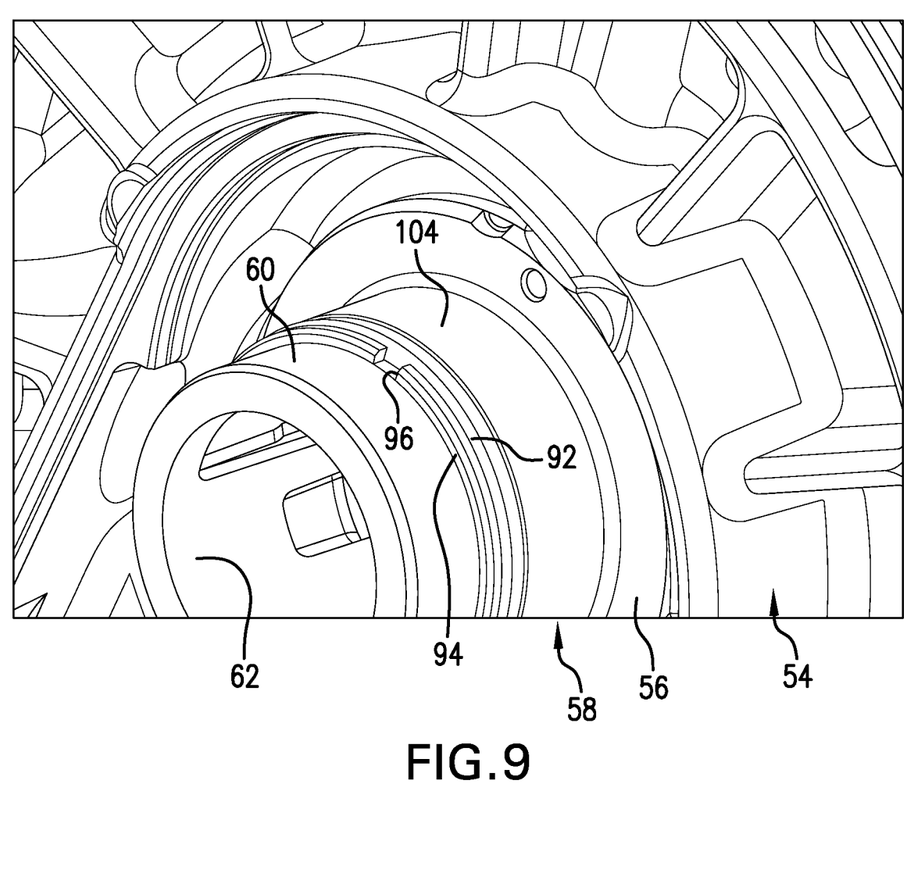
FIG. 9 is a detail view of a gear support on the pump housing of FIG. 8, in accordance with a non-limiting example.

Reference will now follow to FIGS. 7-9 with continued reference to FIGS. 3-6 in describing details of gear support 58 and an interface between torque converter 28, pump housing 54, and pump drive gear 66. Gear support 58 includes a seal receiving portion 92 that extends into outer surface 60 and a seal support 94 that extends outwardly of outer surface 60 adjacent to seal receiving portion 92. Seal receiving portion 92 extends entirely about outer surface 60 while seal support 94 includes a gap 96. A seal 98 is disposed in seal receiving portion 92. Seal 98 includes a tab 100 that nests within gap 96. Tab 100 locates and restrains rotational movement seal 98 in order to increase an overall sealing functionality and prevents seal rotation.

Gear support 58 also includes a first sleeve 104 arranged between seal receiving portion 92 and wall 56 and a second sleeve 106 arranged axially outwardly of seal support 94. First sleeve 104 supports bushing 74 in pump drive gear 66 and second sleeve 106 supports sleeved bushing 50 arranged within drive shaft 43. First and second sleeves 104/106 provide support for drive shaft 43 and pump drive gear 66. The added support reduces clearances that may allow for any misalignments between drive shaft 43 and drive gear 66 that may lead to excess wear, undesirable noise, and/or difficulties in assembly. A spacer 108 may be arranged between sleeved bushing 50 and second sleeve 106. Spacer 108 provides additional support that further reduces misalignments that may lead to wear and undesirable noise. A cover 110 is provided over pump drive gear 66 and driven gear 80. A seal 114 extends between cover 110 and an outer surface of drive shaft 43 of torque converter 28 and is supported by a support member 120. Cover 110 creates a closed environment that retains lubricant that may be directed onto or bathe pump drive gear 66, driven gear 80, and/or transmission pump 82.

At this point, it should be understood, that the non-limiting examples described herein provide support for an interface between a torque converter and a transmission system. Incorporating sleeves, bushings, and a tabbed seal into the interface ensures that the drive gear does not pitch about the drive axis. Supporting the drive gear and the drive shaft with the sleeves and bushings leads to reduced wear and lower operational noise thereby enhancing operator satisfaction and further increasing maintenance intervals.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A transmission system comprising:
    a housing including a wall and a gear support extending from the wall, the gear support having an outer surface and an inner surface defining a passage, the outer surface including a seal receiving portion and a seal support axially spaced from the seal receiving portion;
    a seal positioned about the gear support at the seal receiving portion;
    a sleeve arranged on the outer surface of the gear support between the wall and the seal; and
    a pump drive gear mounted on the gear support supported by the sleeve, the pump drive gear including an outer toothed surface, an inner surface, and a bushing arranged on the inner surface, the bushing extending about the sleeve.

2. The transmission system according to claim 1, wherein the pump drive gear includes a surface extending between the inner surface and the toothed surface, the surface including at least two drive slots.

3. The transmission system according to claim 2, further comprising a torque converter including a drive shaft connectable to the pump drive gear, the drive shaft including at least two drive tangs extending into the at least two drive slots.

4. The transmission system according to claim 3, further comprising a sleeved bushing arranged in the drive shaft, the sleeved bushing sealingly engaging the seal.

5. The transmission system according to claim 4, further comprising a first sleeve mounted on the gear support axially inwardly of the seal and a second sleeve mounted on the drive shaft axially outwardly of the seal, the first sleeve engaging the bushing on the drive gear and the second sleeve engaging the sleeved bushing in the drive shaft of the torque converter to promote radial alignment of the drive shaft and the drive gear.

6. The transmission system according to claim 3, further comprising:
    a cover mounted to the housing over the drive gear; and
    a seal element mounted to the cover, the seal element engaging the drive shaft of the torque converter.

7. The transmission system according to claim 1, wherein the seal support includes at least one gap and the seal includes at least one tab that is received in the at least one gap.

8. A drive system comprising:
    a motor; and
    a transmission system connected to the motor, the transmission system comprising:
        a housing including a wall and a gear support extending from the wall, the gear support having an outer surface and an inner surface defining a passage, the outer surface including a seal receiving portion and a seal support axially spaced from the seal receiving portion;
        a seal positioned about the gear support at the seal receiving portion;
        a sleeve arranged on the outer surface of the gear support between the wall and the seal; and
        a pump drive gear mounted on the gear support supported by the sleeve, the pump drive gear including an outer toothed surface, an inner surface, and a bushing arranged on the inner surface, the bushing extending about the sleeve.

9. The drive system according to claim 8, wherein the pump drive gear includes a surface extending between the inner surface and the toothed surface, the surface including at least two drive slots.

10. The drive system according to claim 9, further comprising a torque converter mechanically connected to the motor, the torque converter including a drive shaft connected to the pump drive gear, the drive shaft including at least two drive tangs extending into the at least two drive slots.

11. The drive system according to claim 10, further comprising a sleeved bushing arranged in the drive shaft, the sleeved bushing sealingly engaging the seal.

12. The drive system according to claim 11, further comprising a first sleeve mounted on the gear support axially inwardly of the seal and a second sleeve mounted on the drive shaft axially outwardly of the seal, the first sleeve engaging the bushing on the drive gear and the second sleeve engaging the sleeved bushing in the drive shaft of the torque converter to promote axial alignment of the drive shaft and the drive gear.

13. The drive system according to claim 11, further comprising
    a cover mounted to the housing over the drive gear; and
    a seal element mounted to the cover, the seal element engaging the drive shaft of the torque converter.

14. The drive system according to claim 8, wherein the seal support includes at least one gap and the seal includes at least one tab that is received in the at least one gap.

15. A vehicle comprising:
    a body;
    a plurality of wheels supporting the body; and
    a drive system operatively connected to one or more of the plurality of wheels, the drive system including a motor and a transmission system connected to the motor, the transmission system comprising:

a housing including a wall and a gear support extending from the wall, the gear support having an outer surface and an inner surface defining a passage, the outer surface including a seal receiving portion and a seal support axially spaced from the seal receiving portion;

a seal positioned about the gear support at the seal receiving portion;

a sleeve arranged on the outer surface of the gear support between the wall and the seal; and a pump drive gear mounted on the gear support supported by the sleeve, the pump drive gear including an outer toothed surface, an inner surface, and a bushing arranged on the inner surface, the bushing extending about the sleeve.

16. The vehicle according to claim 15, wherein the pump drive gear includes a surface extending between the inner surface and the toothed surface, the surface including at least two drive slots.

17. The vehicle according to claim 16, further comprising a torque converter mechanically connected to the motor, the torque converter including a drive shaft connectable to the pump drive gear, the drive shaft including at least two drive tangs extending into the at least two drive slots.

18. The vehicle according to claim 17, further comprising a sleeved bushing arranged in the drive shaft, the sleeved bushing sealingly engaging the seal.

19. The vehicle according to claim 18, further comprising a first sleeve mounted on the gear support axially inwardly of the seal and a second sleeve mounted on the drive shaft axially outwardly of the seal, the first sleeve engaging the bushing on the drive gear and the second sleeve engaging the sleeved bushing in the drive shaft of the torque converter to promote axial alignment of the drive shaft and the drive gear.

20. The vehicle according to claim 15, wherein the seal support includes at least one gap and the seal includes at least one tab that is received in the at least one gap.

* * * * *